Feb. 19, 1952     O. BRUMMER     2,586,297
SEALING UNIT
Filed March 7, 1945
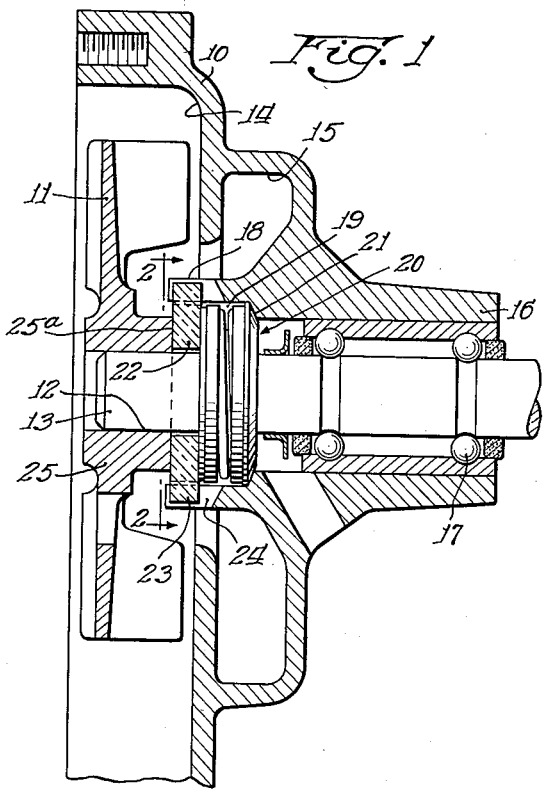
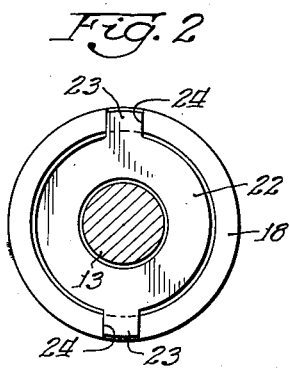
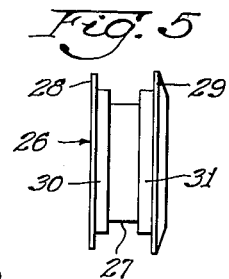
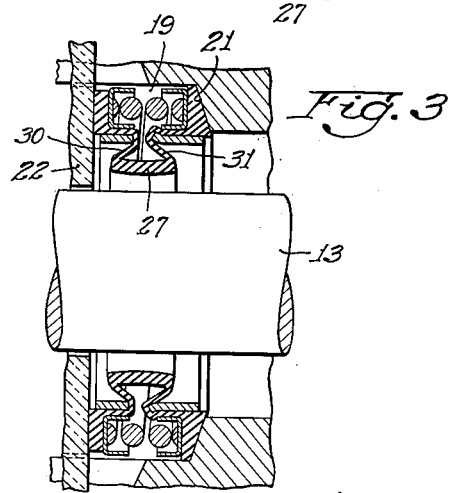
Inventor:
Olin Brummer
By: A. Trevor Jones
Atty.

Patented Feb. 19, 1952

2,586,297

UNITED STATES PATENT OFFICE 2,586,297

SEALING UNIT

Olin Brummer, Oak Park, Ill.

Application March 7, 1945, Serial No. 581,515

7 Claims. (Cl. 286—11)

This invention relates to sealing devices more particularly adapted for use in water pumps or similar mechanisms having a shaft extending into a chamber for liquid, such as in automobile engines, or the like.

The device of the present invention is adapted to retain the liquid within the pump housing and eliminate or at least minimize leakage from the water chamber around the shaft, which leakage might destroy the lubrication of other parts of the engine while at the same time causing a loss of cooling fluid.

The invention aims to provide a seal of this class employing a flexible sealing sleeve and a helical coil spring associated therewith for permitting longitudinal movement of the sealing parts to accommodate stress on the shaft and to take up wear, the device in one aspect of the invention being normally out of contact with the shaft and remaining relatively stationary with the pump housing during rotation of the shaft.

In another important aspect, the present invention resides in a unitary, self-contained sealing device that may be assembled and disassembled as a unit, the parts being so arranged as to prevent so-called "exploding" of the unit under spring pressure when the device is both assembled with and disassembled from the pump.

Among other objects, the invention aims to provide an improved device of this character having a sleeve member of relatively thin section and having a minimum of other parts, thereby effecting economy of manufacture while permitting the adaptation of the device to relatively small axial distances on the shaft.

These and other objects and advantages will be apparent from the following description, taken together with the accompanying drawings, of an illustrative embodiment of the invention, in which drawings—

Figure 1 is a central longitudinal or axial section through a portion of a water pump and showing my improved sealing device associated therewith;

Figure 2 is a cross-section of parts of the structure of Figure 1 taken on the line 2—2 of Figure 1;

Figure 3 is an enlarged fragmentary longitudinal or axial section of the structure of Figure 1 showing parts thereof immediately adjacent the sealing unit, the latter being under compression therein and shown in section;

Figure 4 is a longitudinal or axial sectional view of the illustrative embodiment of my improved sealing unit separated from the shaft, the spring being under compression but to less extent than in Figures 1 and 3; and Figure 5 is a side elevational view of the sleeve separated from the other parts and on the scale of Figure 1.

Referring in detail to the illustrative construction shown in the drawings, the numeral 10 may refer to one end of an automobile water pump casing having therein the pump impeller 11 pressed as at 12 to the rotatable shaft 13, orifices 14 and 15 of the pump casing communicating with the radiator of the engine and with the water jacket thereof, and actuation of the impeller by rotation of the shaft 13 causing circulation therethrough in a well known manner. Also as is well known, the shaft 13 may carry at the end thereof opposite to the impeller the usual fan and pulley, not here shown, it being sufficient here to point out that an object of the present invention is to prevent the entry of water from the passages 14 and 15 into the shaft mounting 16 or between the shaft and its bearings 17 in said mounting.

In such well known structures, the shaft mounting 16 has a cylindrical cup-like extension 18 which is spaced from the shaft and provides a chamber 19 for receiving the sealing unit 20, the sealing unit bearing at one end against the beveled shoulder 21 at the base of the chamber 20 and at its other end against a carbon washer or the like 22, the washer having integral lugs 23 which are received in slots 24 in the mounting extension 18 to hold the washer stationary with the bearing during rotation of the impeller 11, the washer abutting the impeller hub 25 with a smooth running thrust contact during rotation of the shaft and impeller and preventing the passage of fluid between these abutting services as at 25a, the sealing unit 20 performing a similar office between the washer 22 and the shoulder 21 of the shaft bearing.

In accordance with the present invention, my improved sealing unit 20 includes a flexible sleeve-like member comprising a body 26 of an elastomer or rubber-like material, preferably one of the rubber substitutes or synthetics which are now on the market, such as "neoprene" or "Buna" and having the characteristics of flexibility and resilience while resisting deterioration or loss of elastic properties due to heat, cold, moisture or the material with which it comes in contact, and which may be cast or molded to the form here shown, for example, following the present invention.

As here shown the sleeve-like member or body 26 includes a central tubular part 27, a pair of flange-like face parts 28 and 29, and connecting parts 30 and 31 between the tubular part and the face parts, such body itself being broadly disclosed and claimed in my co-pending application S. N. 541,870, filed June 24, 1944, now Patent No. 2,408,909, issued October 8, 1946.

The connecting part 30 is as here shown of angular cross-section including a cylindrical section or part 30a which extends in an axial direction and the part 30b which extends more or less in a radial extension with a corner 30c therebetween. Similarly, the connecting part 31 includes a cylindrical section or part 31a, and a radially extending part 31b, and a corner 31c therebetween. It will be understood that all of the sleeve parts just referred to are annular and that the connecting parts 30 and 31 thus provide a counter-bore as at 32 and 33, respectively, for the sleeve at each end thereof. A resilient distortable annular portion is provided by parts including portions 30b and 31b.

Further in accordance with the present invention, carried in each of the counter-bores 32 and 33, and in this instance received therein in each counterbore is a band or ring 34 in the counter-bore 32 and 35 in the counter-bore 33 of harder material than the sleeve body and in this instance of metal, the metal ring 34 being snugly received in the counter-bore 32 in telescoping engagement with the axially extending connecting part 30a, and the metal ring 35 being similarly received in the counter-bore 34 in snug telescoping engagement with the axially extending part 31a of the connecting part 31. The rings 34 and 35 are desirably of cylindrical shape.

Still further following the present invention, at least one of the rings just referred to and in this instance the metal ring 35 may have holding means interengaging with the body 26 to retain the ring therein. As here shown, the metal ring 35 has at its inner edge an out-turned burr or wire edge 36 which interlocks with an annular groove 37 formed in the inner surface of the corner 31c, between the connecting part portions 31a and 31b. Thus, in assembly, the cylindrical axially extending part 31a of the connecting part 31 must be forced over the out-turned edge 36 of the ring 35 thus locking the ring in snug telescoping engagement with the part 31a, the elasticity and resilience of the body material permitting this expansion and contraction to receive the ring 35 interlockingly therein.

Desirably, a helical metallic coil spring 38 is interposed between the flange-like face parts 28 and 29 and abutting against the inner faces of these parts through the intermediation of a pair of rings or spring clips 39 and 40 respectively, these clips being of box cross-section and providing annular recesses 41 and 42 in the clips in which recesses the terminal convolutions 43 and 44 of the spring are received, these terminal convolutions being advantageously ground flat to enhance the abutment.

As best seen in Figure 4, the holding means of the ring 35 interlocks not only with the groove 37 of the body 26, but also through the intermediation of the body with the spring clip 40, the body corner 31c being in effect clamped between the turned edge 36 and the cylindrical flange or edge 40a of the spring clip 40.

In operation, it will be seen from Figure 1 that my improved sealing unit 20 is inserted into the chamber 19 of the shaft bearing, with the flanged face 29 of the sealing unit abutting the beveled shoulder 21 in the chamber, and to accommodate this, the flange face 29 is also desirably beveled annularly as at 45 to seat on the annular beveled shoulder 21. At the other end of the unit, the flanged face part 28 abuts the carbon washer 22. In each instance, the rings 34 and 35 are spaced just slightly inwardly of the extreme ends of the body 26 as at 46 and 47 respectively so that the rings do not touch the washer 22 or the chamber shoulder 21 directly.

So arranged, the band-like rings serve as stabilizing elements for the sleeve parts, preventing collapse or objectionable distortion of the latter while permitting the sleeve to be made of relatively thinner section than has heretofore been possible in devices of this class. A marked advantage of this construction is that the unit may be made for a relatively short axial distance on the shaft, thus adapting itself to pump constructions in which this distance is materially reduced for economy of space and weight and also to minimize the area over which the sealing element must function.

As has been hereinbefore mentioned, the sealing unit 20 is under compression when in the structure of Figure 1 both to accommodate slight variations in the shaft 12 and also to take up wear at the meeting face 25a between the carbon washer and the impeller hub, and Figure 3 shows somewhat the positions which the parts of the seal assume when compressed as in Figure 1. It will be seen that the tubular central part 27 of the sleeve telescopes into the connecting parts, the parts being desirably non-folding, the rings 34 and 35 preventing the parts from folding upon each other while stabilizing the face parts 28 and 29 and maintaining these latter in unbroken abutment with the surfaces which they abut as already described.

Also, as already mentioned, Figure 4 shows the sealing unit when removed from the pump and illustrates its unitary, non-exploding characteristics. In other words, the parts of the sealing unit are snugly held together against accidental disassembly, while at the same time the spring 38 may be preloaded, that is, is under compression even when the sealing unit is removed from the pump, the body 26 limiting expansion of the spring 38, which in a normal fully expanded movement is substantially greater than shown in the partly compressed position of the coil spring 38 indicated in Figure 4. The rings 34 and 35 here again stabilize the body 26 and assist the body in maintaining the spring 28 under compression. Here again, the interlock between at least one of these rings, in this instance the ring 35, with the body 26, and also advantageously with the spring clip 40 further assists in stabilizing the rubber-like sleeve, while permitting the latter to be of relatively light material and thin cross-section.

The flanged part 29 is desirably of slightly larger diameter than the spring clip 40 as at 29a so as advantageously to be displaced slightly toward the axis of the sealing device by the wall of the chamber 19, to enhance the seal at this point. Also the flanged part 28 is desirably slightly smaller in diameter than the spring clip 39, as at 28a, so as to permit slight displacement of this flanged part 28 radially outwardly under compression between the clip and the washer 22, to enhance the seal at this point.

As broadly disclosed and claimed in my co-pending application S. N. 541,870, Patent No. 2,408,909, issued October 8, 1946 above referred to, the tubular part 27 and the flanged parts 28 and 29 thereof are desirably of substantially greater cross-sectional thickness than the connecting parts 30 and 31. Thus advantageously, and as best shown in Figure 3, the connecting parts 30 and 31 tend to flex or stretch slightly when the sealing device is compressed and have little if any tendency to distort the tubular part 27, which later telescopes into the counter-bores 32 and 33 without material curling or rolling. The stabilizing rings 34 and 35 further assist in flexing the connecting parts 30 and 31 without material distortion of the tubular part 27.

It is to be understood that the invention is not intended to be limited to details of construction here shown for purposes of exemplification and furthermore it is not to be understood as essential that all features of the invention be used conjointly, since various combinations or sub-combinations may at times be advantageously employed.

The invention having been described, what is here claimed is:

1. In a sealing device, the combination of a sleeve-like body of elastomeric material having a central tubular part, a pair of flange-like face parts at each end of said tubular part and connecting parts of angular cross-section between said face parts and said tubular part providing counter-bores for said sleeve at each end thereof, the one of said face parts at one end of the device having a beveled surface, a metallic cylindrical ring carried in each of said counter-bores spaced slightly axially inwardly of each end of said body whereby the tubular part telescopes into the connecting parts and said rings at each end of the device respectively during compression, a helical coil spring interposed between said face parts and under compression therebetween, a pair of spring clips interposed between the said face parts and said spring and abutting the spring ends respectively, one of said rings having holding means including an inner turned edge thereon interengaging with said body and through said body with the one of said spring clips adjacent the face part having the beveled end but spaced from the clip by said body.

2. In a sealing device, the combination of a sleeve-like body of elastomeric material having a central tubular part, a pair of flange-like face parts at each end of said tubular part, one of said face parts having a beveled outer surface, said last mentioned face part being connected to the tubular part by a connecting part of angular cross section providing a counterbore at that end of the device, a metallic cylindrical ring snugly carried in said counterbore spaced slightly axially inwardly of the end of the device having the beveled surface face part, a helical coil spring interposed between said face parts, and a pair of spring clips interposed between said face parts and said spring and abutting the spring ends respectively, said cylindrical ring and said spring clip at the end of the device having the beveled surface face part gripping said connecting part therebetween, said spring clip at the last mentioned end of the device having a cylindrical portion cooperating with the cylindrical ring therefor.

3. In a sealing device, the combination of a sleeve-like body of elastomeric material having a pair of flange-like face parts at each end and connecting parts of angular cross-section therebetween providing counterbores for said sleeve at each end thereof, a ring of cylindrical form carried in each of said counterbores reinforcing said sleeve, a helical coil spring interposed between said face parts and under compression therebetween, a pair of spring clips interposed between the said face parts and said spring and abutting the spring ends respectively, said rings and said spring clips gripping said body therebetween.

4. In a sealing device, the combination of a sleeve-like body of elastomeric material having a pair of flange-like face parts at each end and connecting parts of angular cross-section therebetween, one of said face parts and a connecting part providing a counterbore for said sleeve at that end thereof, a ring of cylindrical form carried in said counterbore reinforcing said sleeve, a helical coil spring interposed between said face parts and under compression therebetween, a pair of spring clips interposed between the said face parts and said spring and abutting the spring ends respectively, said ring having holding means including an inner turned edge thereon interengaging with said body and through said body with the one of said spring clips adjacent said connecting part and gripping said body therebetween.

5. A sealing element comprising a sleeve of resilient material having spaced flanges, substantially cylindrical sections adjacent the flanges, and a distortable section intermediate the cylindrical sections; a spring adapted to be compressed between the flanges and exerting a distorting effect through the adjacent cylindrical sections, rigid rings interposed between the spring and flanges, said rings having cylindrical flanges which contact the outer periphery of the cylindrical sections, and rigid bands compressing the cylindrical sections against the ring flanges, whereby to render the cylindrical sections substantially rigid and thus to prevent distortion of the sleeve flanges.

6. In a sealing device, the combination of a sleeve-like body of elastomeric material having a distortable section, a pair of flange-like face parts, one at each end of said distortable section, one of said face parts being connected to the distortable section by a cylindrical connecting part, a rigid cylindrical ring snugly received in said connecting part, a coil spring interposed between said face parts, and a spring clip interposed between the spring and the face part at the end of the device receiving said cylindrical ring, said cylindrical ring and the spring clip gripping said connecting part therebetween, the spring clip having a cylindrical flange portion cooperating with the cylindrical ring therefor whereby to render the cylindrical connecting part substantially rigid and thus prevent distortion of the face part at that end of the device.

7. A sealing device, comprising, a sleeve-like body including a resilient distortable annular portion, a flange-like face part at one end of the body, a cylindrical connecting part between said face part and said distortable portion, a metallic cylindrical ring snugly received in said cylindrical connecting part reinforcing said cylindrical connecting part and said face part, a helical coil spring carried by said body pressing against said face part, a spring clip interposed between said spring and said face part, said clip having a cylindrical flange portion cooperating with said cylindrical ring to reinforce said cylindrical connecting part and said face part.

OLIN BRUMMER.

REFERENCES CITED

The following references are of record in the file of this patent:

UNITED STATES PATENTS

| Number | Name | Date |
|---|---|---|
| 2,276,622 | Leake | Mar. 17, 1942 |
| 2,326,489 | Payne | Aug. 10, 1943 |
| 2,337,639 | Brummer | Dec. 28, 1943 |
| 2,383,667 | Matter | Aug. 28, 1945 |
| 2,408,909 | Brummer | Oct. 8, 1946 |
| 2,425,209 | Snyder et al. | Aug. 5, 1947 |